E. SMITH.

BASE-BURNING STOVE.

No. 6,890. Reissued Feb. 1, 1876.

Witnesses:

W. M. Evans.

Chas Thurman

Inventor:

Elihu Smith by his Attorney

Thos. J. Sprague

N. PETERS, PHOTO-LITHOGRAPHER, WASHINGTON, D. C.

UNITED STATES PATENT OFFICE.

ELIHU SMITH, OF ALBANY, N. Y., ASSIGNOR, BY MESNE ASSIGNMENTS, TO SAMUEL H. RANSOM, TRUSTEE.

IMPROVEMENT IN BASE-BURNING STOVES.

Specification forming part of Letters Patent No. 127,653, dated June 4, 1872; reissue No. 6,890, dated February 1, 1876; application filed November 8, 1875.

*To all whom it may concern:*

Be it known that I, ELIHU SMITH, of the city and county of Albany, and State of New York, have invented an Improvement in Base-Burning Heating-Stoves, of which the following is a specification:

The design of the present invention is to produce a stove which shall embody the following elements, viz: Special channels to conduct currents of air into close contact with the interior of the stove; also, a convex grate or fire-bed supported upon lugs on a dust-ring, and having its periphery below the bottom of the fire-pot, and entirely detached from the interior walls of the stove; also, a chute-ring at the bottom inner edge of the fire-pot, adapted to direct the coal in the fire-pot toward the center of the grate or fire-bed; also, an illuminating-section in the stove, between the ring which supports the fire-pot and the intermediate ring; also, a suitable slot or openings in the body or wall of the stove, opposite the space between the periphery of the grate or fire-bed and the bottom of the fire-pot; also, rear ascending and descending flues, incased in the body of the stove and rising above the upper edge of the fire-pot, adapted to carry off the products of combustion laterally from the combustion-chamber, and to prevent them from passing up around the magazine; also, an annular flue around the base and below the ash-pit section, and adapted to form a partition of the flue communication between the fire-pot and escape-flues; also, an arrangement of devices by which the direct radiation from the fire-pot, with its poisonous gases, is prevented from escaping into the apartment.

These elements, in their various combinations and arrangement, as hereinafter will be explained, and whereby an effective and beautiful heating-stove is constituted, form the object and scope of the present invention, as will be now more fully set out and explained.

Figure 1:
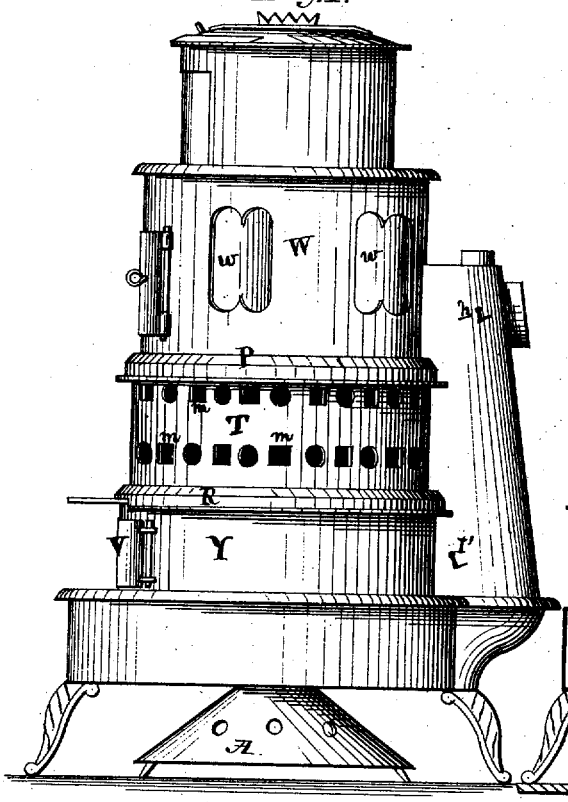
Figure 2:
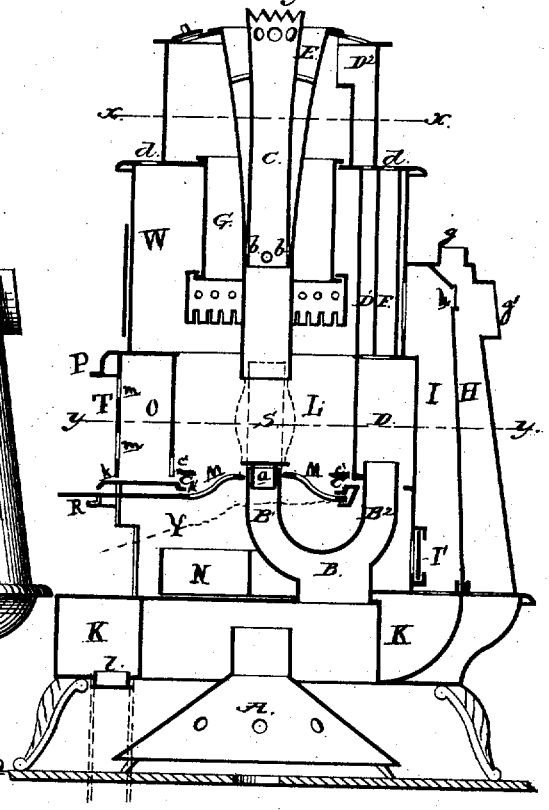
Figure 3:
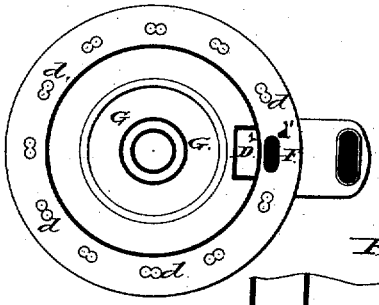
Figure 4:
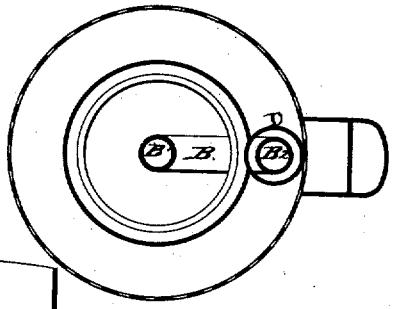
Figure 5:
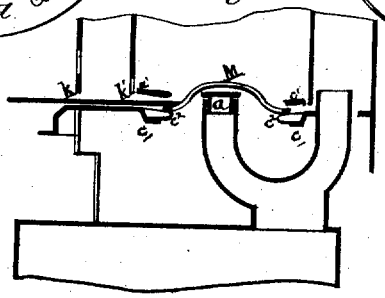

Figure 1 is a side elevation. Fig. 2 is a vertical central section from front to rear, showing the grate or fire-bed supported below the dust-ring, so that the former may be dumped, if desired, while the latter will prevent the fuel from sliding off the grate. Fig. 3 is a plan view on the line *x x* in Fig. 2. Fig. 4 is a similar view on the line *y y* in same figure. Fig. 5 is a detail, in section, showing the grate or fire-bed resting upon the lugs on the dust-ring.

Like letters indicate like parts in each figure.

In the accompanying drawings, A denotes an inverted funnel-shaped air conductor and deflector placed beneath the recessed base of the stove. Air from the room in which the stove is placed, or from the opening in the floor beneath the deflector, passes through said deflector, and is conducted through an opening in the base-plate into the curved or semicircular tube or flue B, which has two vertical branches, $B^1$ $B^2$. The branch $B^1$ extends into an opening in the center of the convex grate or fire-bed, and is provided with a detachable cap, *a*, which cap may be removed and connection made with the central pipe C by means of a joint of pipe, (shown in dotted lines,) whereby the air may be conducted through the center of the stove, and out at the top. This branch is so curved as to permit the dumping of the grate or fire-bed by which it is encircled, as indicated by dotted lines in Fig. 2. The branch $B^2$ enters and opens into the pipe D in the rear of the fire-pot, which pipe connects with the pipes F and $D^1$, and from the latter into the pipe $D^2$, whence it opens into the room through the top of the stove. An opening, *d'*, at the top of the pipe F, permits air to enter said pipe, and, passing down the same into the top of the pipe D, is discharged into the pipe $D^1$, thence up into pipe $D^2$, and out of the top of the stove into the room. The flame and gases from the fire encircle the pipes $D^1$ and F as they pass through the combustion-chamber W, the walls of which are set with mica lights, and the air which is conducted through them becomes highly heated, and rises in a rapid current through the pipes $D^1$ $D^2$, producing a thorough circulation of the air in the room. If desired, the air which passes through the pipe $D^2$ may be further conducted through the stove by being made to enter the flaring pipe E through an opening near the top of flue $D^2$, and, passing down around the central flue *c*, will enter said flue through holes *b*, whence it will rise and find exit at the top. Both the center and the side flues may be in operation at the same time, if desired. G is the fuel-magazine, which may be shaken or jarred by means of a poker or other convenient instrument from the outside, to feed the fuel to the fire-pot should it become clogged or choked. The grate or fire-bed M is convex in shape, and may rest either above the dust-ring *c*, upon suitable lugs $c^2$, as shown in Fig. 5, or below the ledge *e*, as shown in Fig. 2, and in the latter case it can be so arranged and adjusted as to be dumped when occasion requires, as shown in dotted lines in Fig. 2.

In the walls of the stove is a suitable slot or opening, *k*, opposite a horizontal space, *k'*, between the periphery of the grate or fire-bed, and the bottom of the fire-pot, and by this means opportunity is afforded to insert a poker when it is desired to shake the grate or fire-bed. Likewise the walls of the stove in this section, which is shown by the letter T, and which may be denominated the illuminated fire-pot section, may be provided with openings *m* for illumination. This illuminated section, occupying nearly the vertical central portion of the stove, and placed between the ring R that constitutes the grate or fire-bed support and that shown by the letter P, upon which the fire-pot is pendent, gives a greater degree of solidity and strength to the stove, without detracting from its appearance. A flanged collar or chute, *c'*, is provided, resting upon a shoulder formed around the inner circumference of the fire-pot, just above the grate or fire-bed, to prevent the coals from becoming wedged between the grate or fire-bed and fire-pot, so as to interfere with the movement of the former, and to deflect the coals toward the center of the grate or fire-bed.

The products of combustion may escape from the fire-pot L directly through the dampered opening *h* into the top of the rear incased ascending-flue H, and then to the exit-pipe, or, by closing said damper *h*, be led into the incased descending rear flue I, and thence into the annular flue K, about the base, and, from this, escape upward through the rear incased flue H and out of the exit *g* or *g'*. These exits are arranged so that if it is desired to carry the stove-pipe into the chimney at a point above the stove, the pipe would be placed on the collar of the exit *g*, a suitable cap being used to cover the exit *g'*. Should the entrance to the chimney be at a lower point, the pipe may be connected with the exit *g'*, while the exit *g* may be closed by a suitable stopper.

It will be noticed that the fire-pot L is supported by, and pendent from, the ring P, forming a close joint therewith, thereby cutting off all communication between the ash-chamber and the combustion-chamber, except through the fire-pot. The ash-drawer N is recessed at the back so as to pass beyond and embrace the flue B. A damper, I', is provided in the rear of the ash pit or chamber, by which means the draft can be regulated and a dust-escape afforded direct to the exit-pipe.

In the recess formed around the top of the combustion-chamber, mica-lights *d* are inserted, through which light is thrown out to the top of the room. By means of these lights the condition of the fire can readily be examined. In the ash-pit proper, Y, there is the usual draft-door, covering an opening through which the ash-pan may also be withdrawn.

My stove may be employed as a drum for utilizing heat generated elsewhere, by removing the cap from the opening *l*, in the annular flue *k*, and making connection with a stove, furnace, or other heating apparatus in a room below.

In the operation of my stove it will be observed that air-currents entering through the ash-pit proper for the purpose of feeding combustion not only pass through large and numerous openings in the grate or fire-bed, but, by reason of the entire detachment of the latter from the walls of the stove and from the fire-pot, pass around the periphery of the grate or fire-bed and under the lower edge of the fire-pot, through the space between it and the top of the grate or fire-bed, so that there is supplied to the incandescent coal, near its outer edges and toward its center, a large supply of air. Through the branch B' of the central flue, when the lineated pipe S is removed and the cap *a* in place, there is supplied an additional volume of air to the very center of the incandescent fuel. With the ordinary revertible-flue system such a supply of air would be too great to effect a perfect combustion, but, by reason of the incasement of such flues and the direct heating of the ascending flue by the products of combustion, the currents passing along such flues are hastened in their movements, so that the supply of air afforded is not excessive, and the result is a more perfect combustion of the coal, and of all resultant gases. An objection prevails very generally to allowing the air heated to a very high degree by contact with iron, also heated to a high degree, for the reason that the carbonic-acid gas evolved from the latter so impregnates the former as to be injurious to health. To obviate this evil a a space, O, is left between the pendent fire-pot and the wall of the section T, which space, being filled with air, prevents the direct radiation from the fire-pot beyond the wall of the stove. A communication between this chamber O and the ash-pit proper Y is had by means of the space between the grate or fire-bed and the walls of the stove, the former being entirely detached from the latter, as hereinbefore described. By opening the dampers I' and *h* the poisonous gases are drawn from the chamber O, through the annular space *k'*, to the exit-pipe, and discharged into the chimney.

What I claim as my invention, and desire to secure by Letters Patent, is—

1. A heating-stove provided with a back or side flue and flues B $B^1$ $B^2$ for conducting air from the side of or from beneath the stove, through the combustion-chamber and out into the room, substantially as and for the purpose set forth.

2. In a heating-stove, provided and in combination with back or side flues, flues B $B^1$ $B^2$, for conducting air from the side, or from the floor below the stove, through the combustion-chamber, and out into the room, and the flue F, substantially as described.

3. The combination of the curved tube B $B^1$ $B^2$ and central and side flues C and D, substantially as described.

4. The curved branch $B^1$ of the flue B, to permit the dumping of the grate or fire-bed.

5. The combination of the deflector A, tube B $B^1$ $B^2$, and flues C and D, substantially as described.

6. The flue B, with its branches $B^1$ $B^2$, in combination with the combustion-chamber and an opening through the side or bottom of the stove for the admission of fresh air.

7. In a heating-stove, ascending and descending flues incased at the rear and within the walls of the stove, flues below the ash-pit, a grate or fire-bed the periphery of which is below the bottom of the fire-pot, and the front of the fire-pot cut away at its base, combined to operate substantially as and for the purposes set forth.

8. In a heating-stove, and in combination with the grate or fire-bed placed below the bottom of the fire-pot, a dust-ring in the ash-pit section, to guide the ashes into the ash-pan, substantially as described.

9. In a heating-stove, ascending and descending flues incased within the rear of the stove, flues in the base below the ash-pit section, a space between the periphery of the grate or fire-bed and the bottom of the fire-pot, an opening in the outer shell of the stove, opposite the fire-pot, a dust-ring in the ash-pit section, and a damper in said ash-pit section, affording communication between the same and one of the vertical flues, combined substantially as specified.

10. In a heating-stove, and in combination therewith, a dust or ash ring within the ash-pit, projecting inwardly and downwardly, for the double purpose of guiding the ashes and débris of the fuel above into the ash-pan below and of forming a support to the grate or fire-bed, substantially as set forth.

11. In a heating-stove, a grate or fire-bed below the bottom of the fire-pot, and supported upon lugs or studs on the dust-ring, substantially as described.

12. In a heating-stove, a fire-pot shortened in front, a grate or fire-bed below the bottom of the fire-pot, a dust-ring in the ash-pit, and an opening or openings in the shell or wall of the stove, opposite the lower portion of the fire-pot, and combined to operate substantially as and for the purposes set forth.

13. In a heating-stove, and in combination therewith, an independent illuminated section around the fire-pot, and with no communication between it and the combustion-chamber, in combination with an open space between the wall or shell of said section and the fire-pot, substantially as specified.

14. In a heating-stove, the rear projections, whereby the flues incased therein rise above the top of the fire-pot and take the products of combustion from the combustion-chamber at a point above the top of said fire-pot, in combination with a base-flue below the bottom of the ash-chamber, substantially as set forth.

15. In a heating-stove, and in combination therewith, a grate supported, in whole or in part, upon the dust-ring, and entirely detached from the inner walls of the stove, and with its periphery below the bottom of the fire-pot, substantially as and for the purpose set forth.

16. In a heating-stove, and in combination, a grate or fire-bed entirely detached from the walls of the stove, a fire-pot, a combustion-chamber, and a rear and base system of flues, whereby air taken from the front through the usual draft-openings and in the draft-chamber, highly heated, passes around the periphery of said grate and is conducted down the descending flue, around the base, and up the ascending flue, for the purpose of heating the base of the stove, substantially as shown and described.

17. In combination with a fire-pot, the flange $c'$, for the purpose of deflecting the coal onto the grate and preventing it from wedging between the grate or fire-bed and fire-pot, substantially as described and shown.

18. In a heating-stove, the grate or fire-bed entirely detached from the walls of the stove and capable of being rotated, substantially as described and shown.

ELIHU SMITH.

Witnesses:
B. BENTON,
J. P. SANFORD.